United States Patent [19]
Doan

[11] Patent Number: 5,733,943
[45] Date of Patent: Mar. 31, 1998

[54] STREET SIGNS AND OTHER PRODUCTS AND METHOD FOR MAKING SAME FROM USED RUBBER TIRES

[76] Inventor: Rosetta C. Doan, 4045 Linkwood #121, Houston, Tex. 77025

[21] Appl. No.: 597,663

[22] Filed: Feb. 7, 1996

[51] Int. Cl.⁶ .................................................. C08J 11/04
[52] U.S. Cl. ...................................... 521/41; 428/495
[58] Field of Search .......................... 428/495; 264/237, 264/4; 524/406; 525/99; 521/41

[56] References Cited

U.S. PATENT DOCUMENTS

| | | | |
|---|---|---|---|
| 2,240,015 | 4/1941 | Peik | 260/723 |
| 2,437,538 | 3/1948 | Kelly, Jr. | 260/5 |
| 2,723,934 | 11/1955 | Morris et al. | 428/311 |
| 2,809,944 | 10/1957 | Sverdrup | 260/2.3 |
| 3,386,925 | 6/1968 | Dillhoefer | 525/222 |
| 4,003,408 | 1/1977 | Turner | 264/41 |
| 4,028,288 | 6/1977 | Turner | 260/2.3 |
| 4,110,420 | 8/1978 | Turner | 264/4.1 |
| 4,970,043 | 11/1990 | Doan et al. | 264/237 |

OTHER PUBLICATIONS

Technical Bulletin from Shell Chemical Company entitled "Shell Kraton® Rubber for Modification of Thermoplastics," No. SC:165–77 (Feb. 1977), 6 pp.

*Primary Examiner*—E. Rollins Buffalow
*Attorney, Agent, or Firm*—Browning Bushman

[57] ABSTRACT

Reground rubber from used tires is mixed with a styrene-butadiene copolymer and polypropylene or polyethylene. The mixture is placed under temperatures and pressures to form a plasticized, moldable material, which is then injected into a mold to form sheet material suitable for street signs and other products. Alternatively, acetal resin is substituted for the polypropylene or polyethylene. Alteratively, a moldable product is formed from 75% reground rubber and 25% styrene-butadiene copolymer, which is then combined with ground polypropylene and virgin rubber, in which the combination is comprised of 25% virgin rubber, by weight. The combination is then partially plasticized under temperature and pressure, and then injected into a mold to form sheet material for street signs and other products.

5 Claims, 4 Drawing Sheets

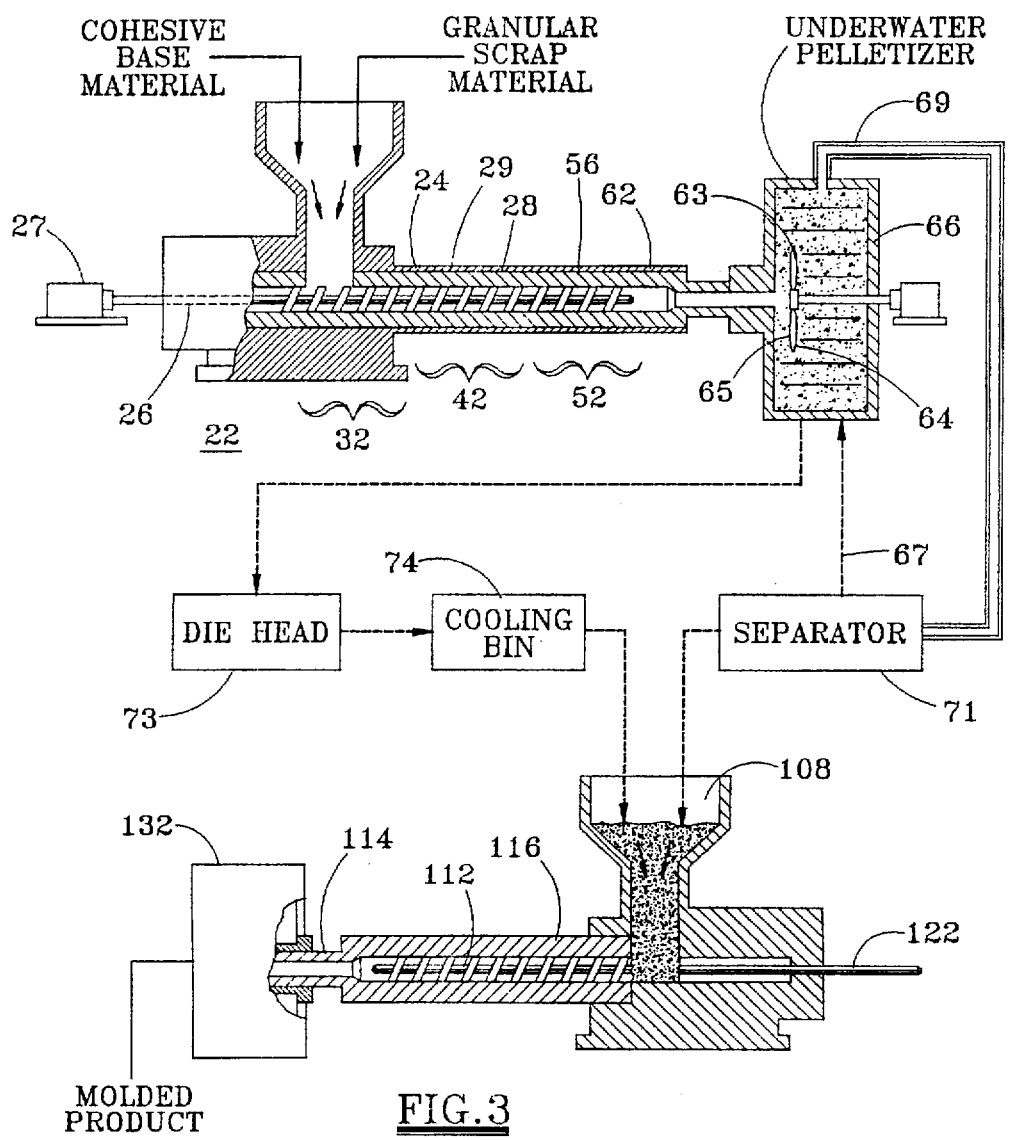
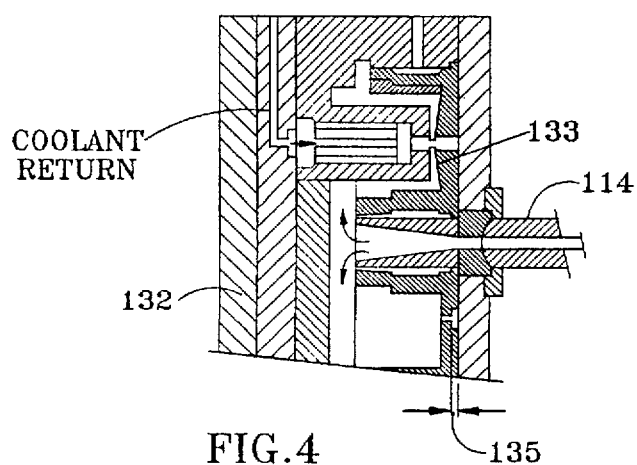
FIG.3
FIG.4

STREET SIGNS AND OTHER PRODUCTS AND METHOD FOR MAKING SAME FROM USED RUBBER TIRES

BACKGROUND OF THE INVENTION

The present invention relates, generally, to new and improved products, for example, street signs, such as stop signs, caution signs, speed limit signs, street and highway identification signs, distance to the next city signs, and the like, and to a new and improved process for matting such products from old or used rubber tires.

The costs associated with the initial installation of street signs has escalated in recent years, for a variety of reasons, costs which are typically borne by everyone who pays county, state and federal taxes. In addition, because street signs are frequently manufactured from sheet aluminum, thieves have made it a common practice to steal the signs and sell them to aluminum metal dealers, not unlike the more common practice of collecting aluminum cans and selling them to the aluminum metal dealers for the price of the aluminum. This practice causes a need for replacing the stolen street signs, adding to the taxpayer's burden.

In addition to a need for producing street signs from non-aluminum starting material, there is an over-riding need to use old, rubber tires in other useable products. In my earlier U.S. Pat. No. 4,970,043 (the '043 patent), issued on Nov. 13, 1990, Albert W. Mitchell and I described a process for using old rubber tires to make useable products. However, because we felt at the time that the reground rubber starting material should comprise at least 50% of the overall composition, the final products made in accord with the teachings of the '043 patent were for most applications not rigid enough for street signs.

In addition to my earlier '043 patent, there are numerous other examples of attempts by those skilled in this art to use old, used materials in processes for making new products. As examples of the prior art, plastics may be formed and subsequently molded into useful articles by a variety of methods. For example, in extrusion processes, a polymer may be propelled continuously along a screw through varying regions of high temperature and pressure such that the polymer is melted and compacted and finally forced through a die shaped to give the final object. The molding of thermoplastic materials may likewise be accomplished by a number of devices and methods, including injection molding. In an injection molding process the polymer is generally preheated in a cylindrical chamber to a temperature at which it will flow and then forced into a relatively cold closed mold cavity by means of high pressures applied through a plunger. A reciprocating screw may be employed to deliver the feed to the mold. A brief description of these processes may be found in Billmeyer, Text Book of Polymer Science (2d Edition, 1971), pp. 492–498.

Extruders have been employed to form plastic compounds, including various kinds of recycled rubber. For example, U.S. Pat. Nos. 4,003,408 and 4,110,420, issued to James E. Turner, describe an apparatus including an extruder to form a porous pipe made primarily of rubber and synthetic rubber reclaimed from rubber tires. U.S. Pat. No. 3,386,925 issued to Dillhoefer makes reference to injection molding and extruding of a thermoplastic rubber blend comprising reclaimed rubber, and U.S. Pat. No. 2,809,944, issued to Sverdrup, makes reference to the use of a screw impeller in processing a reclaimed rubber by joint working and admixture of a vulcanized rubber scrap and a thermosetting phenolformaldehyde resin at a temperature within the rubber-reclaiming range.

The patent literature discloses a variety of processes which attempt to process a reclaimed rubber. For example, U.S. Pat. No. 4,028,288 issued to James E. Turner discloses a heat and pressure molded end product made of a mixture of particlized rubber tires and a lesser amount of a synthetic resin thermoplastic material. The porosity of the molded end product is controlled by the amount of rubber material bits mixed in the precursor material. Thus, it is stated that a 50—50 rubber-plastic mixture results in an end product.

U.S. Pat. Nos. 4,110,420 and 4,003,408, also issued to James E. Turner, disclose a method and pipe product made primarily of rubber and synthetic rubber reclaimed from rubber tires. The rubber and synthetic rubbers-are ground to a relatively small size, and process mixed through a pipe extruder with a smaller amount of a binder mix of primarily polyethylene, along with vinyl, ABS binder, and a trace of attaclay. A porous pipe said to be useful in underground irrigation is formed.

U.S. Pat. No. 3,386,925 issued to Dillhoefer discloses a blend which may be formed by injection molded extrusion and other processes. The blend is made of a copolymer of ethylene and vinyl acetate containing from 12 to 25 weight percent based on the copolymer of vinyl acetate and a reclaimed rubber with certain characteristics. The copolymer is present in a concentration of 20–85 weight percent based on the blend. Reclaimed rubber is defined as the depolymerization product of vulcanized comminuted rubber which retains at least in part the cross links imparted by the vulcanization process of the original rubber.

Other patents disclose reclaimed rubber compositions, such as U.S. Pat. No. 2,437,538, or a process for reprocessing reclaimed vulcanized rubber, such as U.S. Pat. No. 2,809,944, wherein there is disclosed a process for forming certain products from vulcanized rubber scrap, such as scrap from tires and a thermosetting phenolformaldehyde resin by mixing the resin with the vulcanized rubber and reclaiming the rubber by plasticizing the materials in admixture by a joint working at a temperature within the rubber-reclaiming range followed by subsequent curing under vulcanizing conditions. The plastic may be in the range of from 5 to 15% of the vulcanized rubber product.

A variety of other processes have been disclosed utilizing old rubber particles. For example, U.S. Pat. No. 2,240,015 discloses a process whereby a dispersed emulsion of old rubber particles is sprayed on a surface and then baked. Similarly, in U.S. Pat. No. 2,723,934 there is disclosed a porous rubber material made from vulcanized rubber with an adhesive reinforcing substance added in the interstices of the rubber.

There is a reference in the advertising literature to using copolymers for upgrading recycled and scrap material. More particularly, in a technical bulletin from the Shell Chemical Company entitled "Shell Kraton® Rubber for Modification of Thermoplastics," No. SC: 165–77 (February 1977) it is stated that Kraton rubbers may be used for general upgrading of recycled and scrap material.

Another problem with the processing of old, used rubber to manufacture street signs resides in a need for the street sign material to resemble the gray color of aluminum, in addition to the need for the finished street sign to be fairly rigid, without being brittle, as would be the case with making such signs from common plastics.

It is therefor the primary object of the present invention to provide a new and improved products from devulcanized rubber products, such as old or used rubber tires.

It is also an object of the present invention to provide new and improved products manufactured from devulcanized rubber products.

It is a further object of the present invention to provide a new and improved method of manufacturing new and improved street signs.

It is yet another object of the present invention to provide new and improved street signs having similarities to aluminum while being manufactured in part from devulcanized rubber.

SUMMARY OF THE INVENTION

These and other objects of the invention are satisfied, generally, by mixing reground rubber from used tires with a copolymer, cohesive base material and either polypropylene, polyethylene or an acetal resin, or mixtures thereof, subjecting such mixture to temperatures and pressures sufficient to at least partially plasticize the mixture, and injecting the plasticized mixture into an injection mold, thereby creating a sheet material suitable for street signs or similar products.

In another embodiment of the invention, reground rubber from used tires is combined with a copolymer, cohesive base material, which is then at least partially plasticized under temperature and pressure to create a moldable product, which is then mixed with polypropylene, polyethylene or an acetal resin, or mixtures thereof, and virgin rubber, after which the mixture is at least partially plasticized, under temperature and pressure, and then injected into an injection mold, thereby creating a sheet material suitable for street signs or similar products.

BRIEF DESCRIPTION OF THE DRAWINGS

FIG. 3 is a schematic view of another embodiment of the present invention;

FIG. 4 is a schematic view of a portion of one aspect of the embodiment shown in FIG. 3;

DETAILED DESCRIPTION OF THE PREFERRED EMBODIMENT

The following description of FIGS. 1–4 is for the most part described in my U.S. Pat. No. 4,970,043, but is repeated herein for the sake of continuity of the teachings of the present invention.

Figure 1:
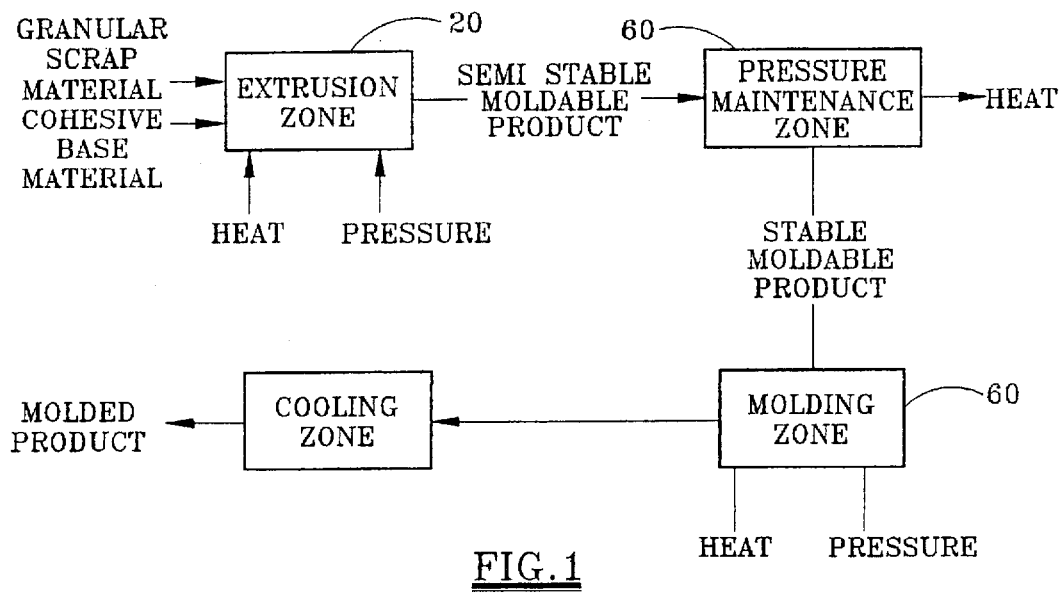
FIG. 1 is a flow chart depicting one embodiment of the present invention.

Referring generally to FIG. 1 there is shown a schematic outline of one embodiment of the present invention. Referring generally to that figure a granular scrap material such as a high grade reground rubber and a cohesive base material are fed to an extrusion zone 20. The granular scrap material and the cohesive base material are subjected to sufficient pressure and temperature for a sufficient residence time to form a semi-stable moldable product believed to have an aggregate interior portion at least partially encapsulated by an outer cover layer. The semi-stable moldable product then passes to a pressure maintenance zone 60 where the semi-stable moldable is maintained under a sufficiently high pressure while being at least partially cooled thus resulting in the formation of a stable moldable product, apparently since the outer cover layer is allowed to strengthen. The stable moldable product may be treated as an end product of the process. Alternately, the stable moldable product may be ultimately passed to a molding zone 80. In the molding zone 80, the stable moldable product is heated sufficiently to form a plasticized moldable material under sufficient pressure to avoid significant deterioration of the plasticized moldable material. The plasticized moldable material is then injected into a mold at a sufficiently high velocity to avoid significant localized cooling. The plasticized moldable material is then subsequently at least partially cooled in the mold while sufficient pressure is maintained to avoid significant deterioration of the material. The resulting material is then passed to cooling zone 100 where the material undergoes further cooling to the extent required to form a molded product.

The ratio of the granular scrap material to the cohesive base material may vary over a wide range depending upon the ultimate characteristics desired in the moldable product and the molded product. For example, the ratio of the granular scrap material to the cohesive base material may be in the range of 7:3 to 9:1 or higher and still result in a product having proper conformation and integrity and relatively low porosity. The type of materials employed may also be varied. For example, the granular scrap material may be a high grade reground rubber, while the cohesive base material may be a thermoplastic polymer such as a styrene-butadiene block copolymer. However, where a reground rubber is used it is believed preferable for the granular scrap material to be a high grade rubber, such as that used in airplane and truck tires having reduced debris as compared to reground rubber obtained from many automobile tests.

Pressures and temperatures may also vary over a significant range, though pressures and temperatures must be such as to sufficiently promote the formation of a stable moldable product and prevent the significant deterioration of the semi-stable moldable product when a moldable or molded product is formed. The process conditions, such as pressure and temperature, may be obtained by a variety of methods. By way of example, a substantial portion of the pressure or heat required in the extrusion zone may be obtained by mechanical means such as through the use of an appropriately constructed extruder as shall hereinafter be more fully described.

Figure 2:
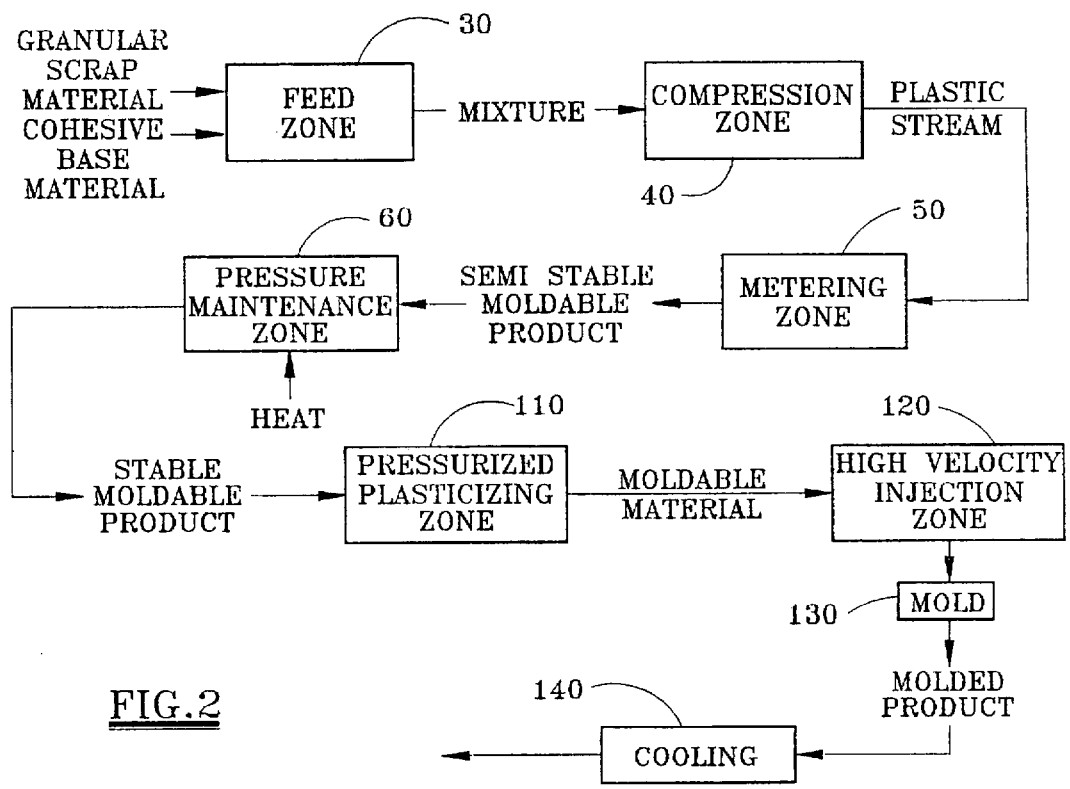
FIG. 2 is another flow chart depicting an embodiment of the present invention.

A schematic of another embodiment of the process is shown in FIG. 2. A granular scrap material and a cohesive base material are fed in predetermined quantities without substantial premixing to a feed zone 30 to form a substantially uniformly distributed mixture. The mixture is then compressed and heated in a compression zone 40 for a sufficient time to form a plastic stream. The plastic stream is then passed through a metering zone 50 under sufficient temperature and pressure until a semi-stable moldable product is formed.

The semi-stable moldable product is maintained under a sufficiently high pressure in a pressure maintenance zone 60 while the semi-stable moldable product is at least partially cooled sufficiently to form a stable moldable product. The stable moldable product may then be treated as a final product of the process. Alternately, the stable moldable product may be ultimately fed to a pressurized plasticizing zone 110 where the stable moldable product is heated sufficiently to form a replasticized semi-stable moldable material while under sufficient pressure to avoid significant deterioration of the material. The replasticized semi-stable moldable material is then passed to a high velocity injection zone 120 and injected into a mold 130 at a sufficiently high velocity to avoid significant localized cooling. The replasticized semi-stable moldable material is then at least partially cooled within the mold 130 while the pressure is maintained on the material at a sufficient level to avoid significant deterioration of the material. The resulting molded product may then be subsequently cooled in a cooling zone 140.

Referring now more particularly to FIG. 3 as well as FIG. 1 and FIG. 2, each zone will now be described in more detail with respect to a particular embodiment.

Extrusion Zone

The extrusion zone 20 as depicted in FIG. 1 may be thought of as comprising a feed zone 30, a compression zone 40 and a metering zone 50 as shown in FIG. 2. In a more particular embodiment as shown in FIG. 3, these three zones may respectively be feed section 32, the pump section 42 and the metering section 52 of extruder 22. Each of these zones will be discussed in turn.

Feed Zone

A granular scrap material and a cohesive base material in a predetermined ratio are fed to feed zone 30 for mixing. Additionally, depending on process conditions, such as temperature, some initial melting may occur in the feed zone.

The cohesive base material and the granular scrap material may be any one of a number of substances. The cohesive base material may generally be any thermoplastic or thermoformed polymer including rigid or elastic thermoformed polymers. By way of example, the cohesive base material may be a butadiene-styrene copolymer such as a thermoplastic block copolymer of styrene and butadiene sold under the trademark Kraton-D-3202 by the Polymers Division of Shell Chemical Company. It is believed that olefinic polymers such as polyethylene may also be used. Similarly, it is believed that polyvinyl chloride may also be used if appropriate temperatures are attainable.

The granular scrap material includes a reground rubber. It is also believed that a wide variety of other thermoset elastomers may be employed, at least presuming that the beneficial effects obtained in practicing the present invention are not due to a specific chemical change such as through a particular catalyzed reaction. Although not wishing to be held to any particular theory it is believed that the proper processing of the granular scrap material and the cohesive base material as disclosed herein results initially in the formation of a semi-stable moldable product having an aggregate interior portion at least partially, if not completely, encapsulated by an outer cover layer. As the outer cover layer or skin is completed and solidifies or strengthens through cooling under pressure and other appropriate process conditions as disclosed herein it is believed that the outer cover layer is sufficiently strengthened to form a stable moldable product. It is believed that this may be a result of the cohesive base material coming to the surface or outer regions of each batch of the moldable or molded product.

However, this may also be due in whole or in part to an acetone-related chemical reaction, discussed hereafter, occurring under the process conditions disclosed herein. For example, it may be possible that the cohesive base material is reacting with some portion of the granular scrap material or otherwise catalyzing the transformation of the granular scrap material. If this is the case then it is believed that the granular scrap material may have to at least partially comprise a reground rubber and for the cohesive base material to comprise a butadiene-styrene block copolymer. The presence of certain additional materials or substances may be required.

The size of the materials being fed to the feed zone 30 may vary. However, it is generally preferable to reduce the particulate size of the materials to promote uniform distribution, mixing, and combination to form the semi-stable and stable moldable products under the process conditions in the system. By way of example, if a reground rubber is employed the particle sizes should generally not be greater than ⅛ of an inch and are preferably smaller. By way of example, the granular scrap material and the cohesive base material may each be in the range of 20 to 40 mesh.

In some instances, it may be preferable to dry the feed materials to reduce their moisture content, since it is possible that a longer residence time may be required if there is too much moisture in the materials entering the feed zone. By way of example, it may be preferable to have a material moisture content of less than 0.2% by weight. However, it is believed that the moisture content will generally not work a change in the intrinsic viscosity or in the properties of the final product. Additionally, if the moisture content of the materials entering the feed zone is sufficient to affect the final product, then it may be desirable to modify certain process conditions. For example, it may be preferable in some instances to use a vented extruder.

It is also believed at least preferable to use a high grade reground rubber which has a reduced debris content as a granular scrap material. For example, a reground rubber made from truck and bus peels and substantially free of foreign fabric and material may be employed. However, I have discovered that the process according to the present invention can also be used with whole tires, as discussed hereinafter with respect to FIG. 5.

Process conditions in the feed zone will generally not vary significantly with the composition of the materials being fed to the feed zone. However, the process conditions in and the configuration of the feed zone should be such as to provide an adequate distribution of the cohesive base material and the granular scrap material. Additionally, process conditions may be varied depending upon process requirements in subsequent zones. For example, as the percentage of granular scrap material increases, it is believed preferable to increase the temperature of the feed zone. Additionally, where the feed zone comprises a feed section 32 of an extruder 22 the size and configuration of the feed zone may be set in relation to the size of other sections such as the metering section 52 to provide appropriate increases in pressure and temperature.

Compression Zone

Once the granular scrap material and the cohesive base material have been formed into a mixture in feed zone 30 they are passed to compression zone 40 where they are formed into a plastic stream under pressure and heat. Although not wishing to be restricted to any particular theory it is believed that this plastic stream may be a type of slurry with the granular material suspended in the cohesive base material.

The pressure and heat may be supplied totally from an external source. Alternatively, a portion of the heat and pressure may be produced by the interaction of the apparatus with the mixture passing from the feed zone 20. For example, in extruder 22 the increase in pressure is caused by the arrangement of the flights 24 on shaft 26 and the size and configuration of the housing such as barrel housing 28. Additionally, much of the heat is generated by friction. However, in most cases where an extruder 22 is employed an external heat source such as heat jacket 29 will supply additional heat as necessary to the compression zone.

As with the feed zone 30, the configuration of and process conditions in the compression zone 40 may be varied depending upon the materials being processed and the configuration of the feed zone 30, metering zone 50 and other zones of the process. By way of example, if an extruder 22 is employed and compression zone 40 comprises a pump or transition section 42 of extruder 22, then the length of the pump section and the overall configuration of the flights 24 in the pump section 42 may be appropriately varied to ensure the proper formation of a plastic stream.

Metering Zone

The plastic formed in compression zone 40 passes through metering zone 50 to form a semi-stable moldable product. As with the other zones the configuration of the metering zone may be varied depending upon process materials and conditions as would be known to one skilled in the art having the benefit of this disclosure. For example, if extrusion zone 20 is comprised of extruder 22 and the pressure is at least partially controlled by the difference in the structure of the flights 24, then the compression ratio between section 32 and the metering section 52 should preferably be within the range of about 30 to 1 to about 40 to 1, while the pump section 42 preferably has a length of about 5 to 8 housing diameters and the length of the metering section 52 is preferably at least about 10 housing diameters. Additionally, the motor 27 which is coupled to shaft 26 preferably has sufficient power to turn the screw at a speed of about 200 revolutions per minute or greater under the process conditions in the extruder 22.

The process conditions within the extrusion zone may be varied depending upon the makeup of the material supplied to the feed zone 30. By way of example, if a reground rubber and a thermoplastic block copolymer of styrene and butadiene are used as the granular scrap material and the cohesive base material respectively, then process condition will be varied depending upon the relative percentages of the materials. However, it is necessary to attain sufficient pressure and temperature in the extrusion zone to ensure that the pressure in the pressure maintenance zone is sufficiently high to induce or provide for the formation of a stable moldable product. For example, where a high grade reground rubber is fed in a 50:50 ratio with the thermoplastic block copolymer the compression ratio of extruder 22 may be 3 to 1 or less with the pressures increasing to 500 psi or less and overall temperatures falling within the range of 280° to 320° F. However, where the reground rubber to thermoplastic block copolymer ratio is in the range of 60:40, ultimate pressures should be greater than 330° F., and generally within the range of 330° to 350° F. along the extrusion zone. Where the ratio of reground rubber to the copolymer is 70 to 30 or greater than the pressure should generally be increased to a pressure greater than 1200 psi and preferably as high as 1800 to 2000 psi or higher if good conformation of the product is to be obtained. Additionally, the temperature should generally be in the range of 350° to 400° F. along the extrusion zone. These varying pressures and temperatures may at least in part be obtained by the proper configuration of the various zones as is the case with the extruder 22 shown in FIG. 3 as indicated above.

As would be known to one skilled in the art having the benefit of this disclosure the overall configuration of the extrusion zone 20 may be varied to attain the appropriate process conditions. By way of example, a vented extruder could be employed to allow more volatile substances to escape. Additionally, feed zone 30 and compression zone 40 may be encompassed into one unit, such as an intensive mixer. By way of example, a vented, twin screw intensive mixer might be employed to produce a plastic stream for passage through a metering zone 50.

The metering section 52 may be equipped with mixing pins 54 to further promote mixing and maintain uniform distribution. For example, if pressure can be maintained, then the use of mixing pins or the like may allow reduction in screw speed below 200 rpms where an extruder is employed to handle a 70:30 mixture by weight of reground rubber and a styrene butadiene copolymer. By way of example, the screw speed could be reduced to 150 rpms depending upon the overall configuration of the extrusion zone. To this end a variety of mixing pins may be employed. For example, visbreaking pins such as dalmige pins may be employed in the metering section 52.

Pressure Maintenance Zone

The semi-stable moldable product passing to pressure maintenance zone 60 must be subject to a sufficiently high pressure in order to prevent the degradation of the semi-stable moldable product for a sufficient time to allow the formation of a stable moldable product. As with the extrusion zone 20 the pressure required will vary depending upon other process conditions including the severity of any reductions in temperature and the makeup of the original materials passed to the feeding zone 30. For example, where a 70:30 mixture of a high grade reground rubber and a styrene-butadiene block copolymer, such as that sold by Shell Chemical Co. under the trademark Kraton-D-3202, is employed, the pressure in the pressure maintenance zone should generally be in the range of 1800 psi or higher with initial temperatures preferably in the range of 380° to 410° F. Pressures in the range of 1900 psi to 2800 psi and higher with temperatures in the range of about 400° to 490° F. have also been employed with success on a 75:25 mixture of reground truck peel and Kraton-D-3202.

The pressure maintenance zone 60 may take on a number of configurations. By way of example, it may comprise a transition zone 62 of extruder 22. To this end the exit orifice from the transition zone should be of appropriate size to allow maintenance of the appropriate pressure for a sufficient time to allow a moldable material to form. To this end it may be generally preferable to avoid the use of a dispersion plug or gate to enhance any back pressure where the use of such a plug or gate would materially reduce the portion of the transition section of the extruder which functions as a pressure maintenance zone. However, the extent of the pressure maintenance zone may be modified to some extent where the material is rapidly cooled upon exiting the pressure maintenance zone. By way of example, as shown in FIG. 3, there could be used an underwater pelletizer in direct communication with the exit 63 of extruder 22. The pelletizer could include a bath 66 with an impeller mechanism 64 having a plurality of hives 65 for shearing off discrete segments of the material leaving extruder 22. Water or other appropriate coolant could be pumped in via line 67 and a cooled pelletized moldable product along with the coolant could be removed via line 69 for recovery in separator 71, all as would be known to one skilled in the art having the benefit of this disclosure. Alternately, as also shown in FIG. 3, where a separate die head such as die head 73 is employed, the partially cooled stable moldable product may be passed directly to the die head and then to a cooling bin such as cooling bin 74. However, the pressure on the material in the pressure maintenance zone must not be reduced until the semi-stable moldable product is transformed into a stable moldable product. Thus, the semi-stable moldable product could not generally be passed from the extrusion zone 20 and allowed to cool slowly for any length of time in air prior to passing to a reduced pressure area such as a cooling bath opened to the atmosphere.

Molding Zone

The stable moldable product leaving the pressure maintenance zone 70 may be treated as the final product of the system. Alternately, it may be passed almost immediately or at a substantial time later to the molding zone 80. In either case, the moldable product may be in a pelletized form, though it may be preferable to remove moisture or other coolant from the pellets where a pelletized form is used.

As shown in FIG. 2, the molding zone 80 may be thought of as comprising a pressurized plasticizing zone 110, a high velocity injection zone 120 and a mold 130. Generally, the stable moldable product is heated under pressure in the pressurized plasticizing zone 110 to form a plasticized moldable material. The pressure should be sufficiently high to avoid degradation of the plasticized moldable material. By way of example, the pressure may be in the range of 200 to 800 psi. Alternately, it may be greater than 800 psi, generally depending at least in part upon the method used to inject the material into the mold. The plasticized moldable material is then passed to high velocity injection zone 120 which serves to inject the plasticized moldable material at sufficiently high velocity into mold 130 to avoid significant localized cooling.

The pressurized plasticizing zone 110 and the high velocity injection zone 120 may be incorporated within the same apparatus as is the case with an injection molding device whether of the plunger type or of the reciprocating-screw type. For example, as shown in FIG. 3, the stable moldable product may be placed into feed hoper 108 and passed in discrete predetermined quantities into cylindrical chamber 116 where it is preheated to an appropriate temperature and under appropriate pressure to form a plasticized moldable material by heating and mixing by screw 112. An external source of heat may also be supplied if appropriate, as would be known to one skilled in the art having the benefit of this disclosure. The screw 112 rotates, forcing the plasticized moldable material forward against a valve 114. The screw 112 moves backward in the cylindrical chamber 116, until enough material to fill the mold has been processed. Valve 114 is then opened and the screw 112 is then pushed forward by means of plunger 122 to fill the mold 132.

As indicated, the fill velocity should be sufficiently high to avoid significant localized cooling in the mold. By way of example, the fill velocity must generally be greater than 3 inches per second for most injection molding devices. It may be necessary to have higher fill velocity, such as 4½ inches per second depending upon a variety of factors such as the thickness of the wall sections of the molded product formed in the mold 130, as would be known to one skilled in the art having the benefit of this disclosure.

Conditions in the pressurized plasticizing zone and the high velocity injection zone should be such as to ensure that sufficiently high pressures are attained in the mold. The pressure in the mold should be greater than 800 psi and should preferably be higher depending upon the configuration of the molded product, the mold and the percentage of granular scrap material originally supplied. By way of example, if a 70:30 mixture is passed to the feed zone to form the stable moldable product, then the pressure is preferably in the range of 1100 to 1200 psi and higher. For example, the pressure may be 1800 to 2000 psi.

Venting and cooling of the mold are generally particularly important to promote molding efficiency and result in a molded product having the appropriate conformation and other properties. Given the high velocity with which the material is injected into the mold, maximum venting is generally required, apparently due to the presence of air in the mold cavity. By way of example, referring to FIG. 4, which shows a schematic view of a mold for a thread protector, the land area 133 of the mold 132 must generally be less than 0.05 inches with a rough cross-sectional area 135 of greater than 0.02×0.375 inches. If the venting is insufficient and any resulting ashes do not escape, then the molded product may not be properly formed. Alternately, by way of example, vent and land areas may be varied through use of partially evacuated mold cavities.

The coolant supplied to the mold, such as by conduit 137 as shown in FIG. 4, should generally be within a specified temperature range. This is believed due to the fact that if the temperature is too low within the mold that the skin or outer covering will reform too quickly or not reform at all. However, temperatures should not be so low as to substantially reduce the efficiency of the mold due to increased time for processing each molded product. By way of example, if water is supplied as a coolant to the mold 132 then the temperature of the coolant entering the mold should preferably be greater than 65° F. but less than 80° F. and most preferably between 70° F. and 75° F.

A variety of variations in the forgoing may be possible. For example, the extrusion zone 20 may be operated in an oxygen-free atmosphere to minimize degradation. Alternately, a nitrogen blanket may be employed. Additionally, the pressure in the metering zone such as metering section 52 may be approximately the same as the pressure in the pressure maintenance zone such as transition zone 62. However, pressure in the pressure maintenance zone may be significantly greater than the pressure in the metering zone. In such a case an appropriate device, such as a check valve, may be employed between the two zones. Furthermore, although a specific mold is shown in FIGS. 3 and 4, the configuration of the mold may be varied as would be known to one skilled in the art having the benefit of this disclosure.

Figure 5:
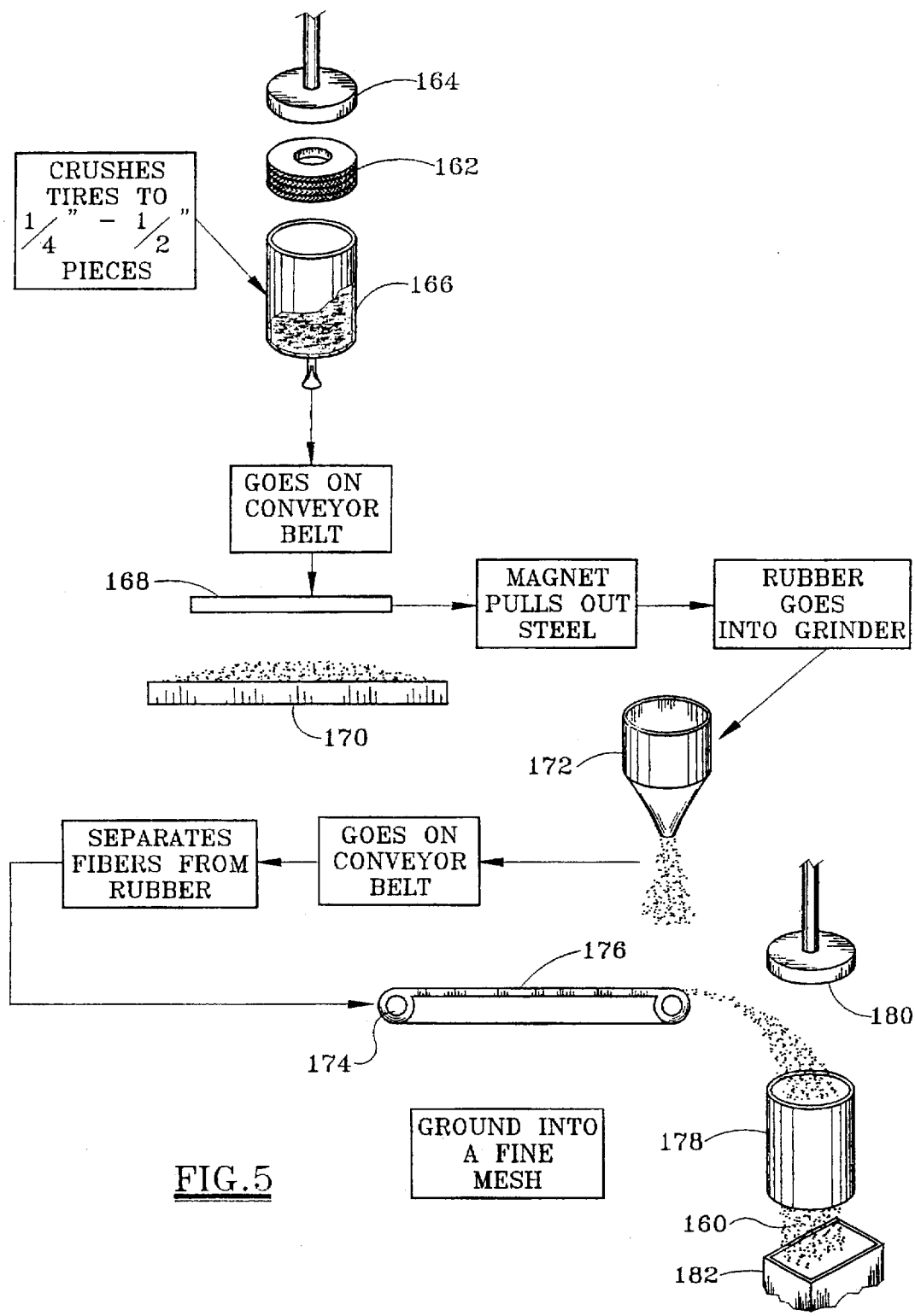
FIG. 5 is a flow chart illustrating a process for regrinding rubber from an old, used tire.

Referring now to FIG. 5, there is illustrated a flow chart of a process for generating fine mesh, reground rubber 160 from an old or used tire 162. The tire 162 can be merely the outer rubber tread of a used or old tire, or can be a whole tire if desired. A cylindrical plunger 164 is used to force the whole tire 162 into a cryogenic tank 166 which crushes the tire into particles typically having a cross-sectional dimension of ¼ inch to ½ inch. The particles are fed onto a conveyor belt 168 passing by a magnet 170 which pulls any steel out of the tire particles normally used in fabricating steel radial tires. After the steel is removed by the magnet 170, the rubber particles are fed into a grinder 172, making the rubber particles even smaller, but also including fibers used in fabricating tires. The rubber particles and fibers are fed onto a conveyor belt 174 having a screen sifter 176 incorporated therein. The fibers in the original tire are thus separated from the rubber particles. The rubber particles are then fed into a cylindrical tank 178 and then ground even finer by a cylindrical plunger 180. The fine mesh rubber particles 160 are then fed from the cylindrical tank 178 into a holding container 182. In utilizing the process according to the invention, beginning first with the flow charted process illustrated in FIG. 1, the free mesh, ground rubber particles 160 are fed into the Extrusion zone 20, labeled as Granular Scrap Material. The other materials in the final compositions of the present invention, described in the following examples, are also fed into Extrusion Zone 20 under the label Cohesive Base Material in FIG. 1.

Once the tire has gone through the tire recycling process illustrated in FIG. 5, I start with the GR30 mesh and add a virgin Kraton-D-3202. These are two normally incompatible materials that are put through an underwater pelletizing machine at very high temperatures, as disclosed in my U.S. Pat. No. 4,970,043. Various compounds consisting of different thermoplastics and thermosets, scrap or virgin, when pelletized at 511° F. while lowering the psi to 2800, chemically alters the chain of sulphur bonds by cracking the modulus which lowers the number of molecules in the chain, completely devulcanizing the sulphur bonds. Acetone is commonly used in fabricating tires. I believe the temperature is causing the butadiene-styrene block copolymer (Kraton-D-3202) end blocks to unite and form a continuous "no cure" network of the rubber pellets forming an aggregate exterior. This chemical altering of the molecules is what enables other materials, thermoplastic and thermoset, to be added. I have discovered that the whole tire can be used as well as just the tread. Depending on the application you can get different physical characteristics, i.e., very soft to very hard, different colors, etc. For the first time one can use a thermoset material and achieve thermoset characteristics in an injection molding machine. The reverse is also true; one can use a thermoplastic material and obtain thermoplastic characteristics in thermoset equipment. It is now a designers' material. The machine used in this process is an underwater pelletizer with a twin screw for a very homogeneous blend. The different processes in which the material can be used include injection molding (thermoplastics), extrusion, compression (thermoset), milled and various other equipment. Depending on the material added, different products can be made. For example, if one adds an acetal such as Delrin, one obtains a very hard product. The products made can be marine billboards, signs, et. As little as 1% tire or as much as 90% of the whole tire can be used as the base for the material process, although a sign having a composition of 50% or more ground rubber may be too flexible.

Acetone is typically used when manufacturing a new tire because it causes the hydrocarbons to mix with the other compounds that go into making a tire. I took a 99.5 liquid acetone extract and covered some GR30 mesh crumb rubber. The acetone completely dissolved the crumb rubber. I placed a few of my black pellets, made in accord with my '043 patent, with the same acetone mixture and it started breaking them apart. Also, I took some grey pellets that had other additives in them and the acetone started breaking them down but not as much as the black pellets. Acetone was put with HDPE (high density polyethylene), making the mixture quite tacky. All of this testing was done at room temperature. I am convinced that the heat and pressure used to make the pellets in the first place, no matter what equipment is used or what other additives are used, creates a chemical reaction, causing devulcanizing of the old tires.

In the initial stages of trying to make acceptable street signs from reground rubber, I discovered through many tests that the reground rubber must be maintained at less than 50% of the total composition. Otherwise, the end product street sign simply is too flexible. Once that determination was made, the following experiments were conducted, with mixed results.

EXAMPLE 1

| | |
|---|---|
| WRF 30 mesh | 21% |
| Kraton-D-3202 | 7% |
| TiO$_2$ | 15% |
| UV | .4% |
| Polypropylene* | 34% |
| HDPE** | 22.6% |

*Shell Polypropylene Co. (Affiliate of Shell Oil Co.) Product No. 5E27
**Fortiflex T60-800-119, Solvoy Polymers, Inc., Houston, Texas This gray composition, while containing only 21%, 30 mesh ground rubber from a whole tire, was too flexible because of having too much (34%) polypropylene. The composition was injection molded at 400° to 450° F. with cooled down molds.

EXAMPLE 2

| | |
|---|---|
| WRF 30 mesh | 8.25% |
| Kraton-D-3202 | 2.75% |
| DELRIN Acetal Resin | 80.41% |
| TiO$_2$ | 8.34% |
| UV | .25% |

Injection molded at 400 to 450° F. with cooled down molds. The end product was dark gray.

EXAMPLE 3

| | |
|---|---|
| WRF 30 mesh | 15% |
| Kraton-D-3202 | 5% |
| DELRIN Acetal Resin | 59.75% |
| TiO$_2$ | 20% |
| UV | 25% |

Injected molded at 400 to 450° F. with cooled down molds. The end product was gray-black.

EXAMPLE 4

| | |
|---|---|
| Polypropylene | 28% |
| HDPE | 18.6% |
| Talc | 10% |
| WRF 30 mesh | 21% |
| Kraton-D-3202 | 7% |
| TiO$_2$ | 15% |
| UV | .4% |

Injection molded at 400 to 450° F. with cooled down molds. By lowering the polypropylene content from 34% (Example 1) to 28%, the rigidity was vastly improved and quite remarkably, the end product was a steel gray color closely simulating the color of aluminum.

EXAMPLE 5

| | |
|---|---|
| WRF 30 | 25% |
| Copolymer Kraton-D-3202 | 25% |
| DELRIN Acetal Resin | 50% |
| TiO$_2$ | 0% |
| UV3346 | 0% |

Injection molded at 400 to 450° F. with a cooled down mold. The end product was black.

EXAMPLE 6

| A. | |
|---|---|
| WRF 30 | 75% |
| Kraton-D-3202 | 25% |

These two products are used first to manufacture pellets in accord with my earlier U.S. Patent No. 4,970,043.

B.

WRF 30, virgin rubber (neoprene) is then added in the following percentages:

| Pellets (see A, above) | 50% |
|---|---|
| Neoprene (virgin rubber) | 25% |
| Polypropylene | 25% |

This combination also produced a usable stop sign sheet material.

In Example 6, the pellets are ground and mixed with the virgin rubber and the polypropylene. Then, the mixture is at least partially plasticized, under increased temperatures and pressures, and was then injection molded to produce a sheet material suitable for street signs.

Figure 6:
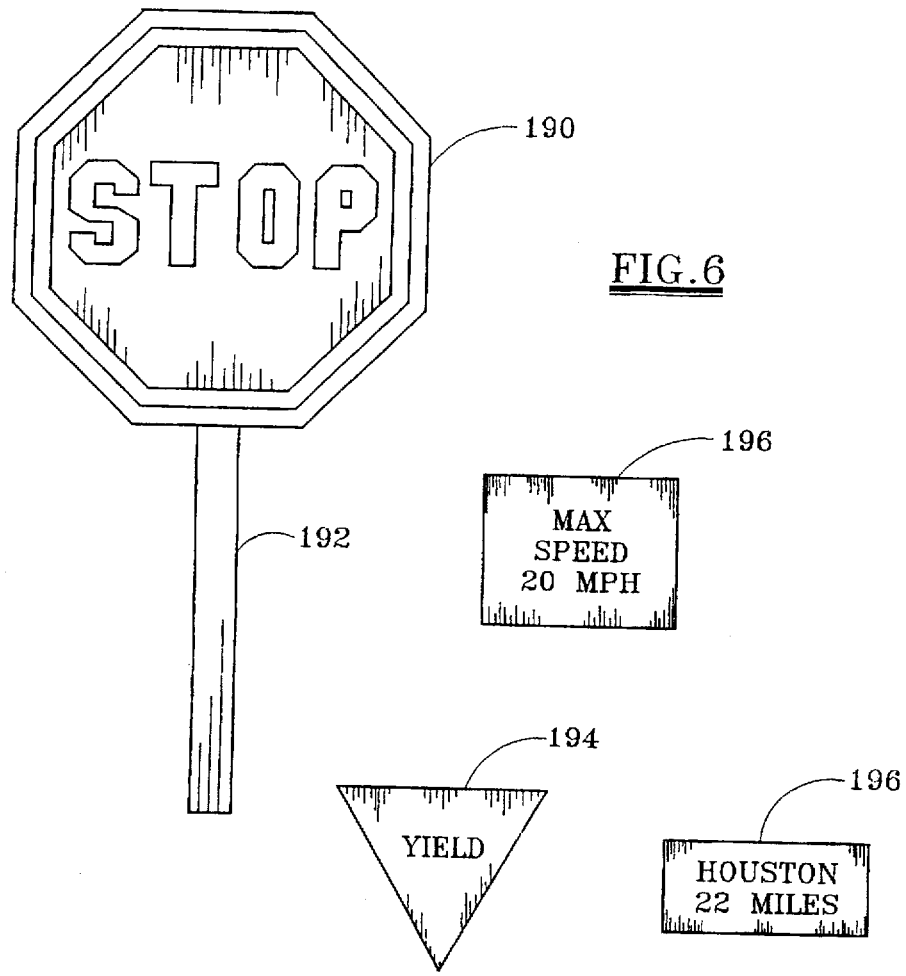
FIG. 6 is a representative view of various street signs which can be manufactured in accord with the present invention.

In fabricating the stop sign 190, illustrated in FIG. 6, for example, the injection mold 132 of FIG. 4 should preferably have internal dimensions for producing a flat, perhaps ⅛ inch thick, sheet of material which should be slightly larger than the largest dimension of the end product stop sign. A typical stop sign in the State of Texas is 24 inches between the flats. The sheet can then be cut down to a conventional octagonal configuration through known methods such as shearing. If desired, the molded sheet can be a square of a desired dimension, requiring only the shearing or cutting of the four diagonal corners. Alternatively, the mold itself can have the desired octagonal configuration, requiting no cutting of the material.

FIG. 6 illustrates a typical stop sign 190 mounted on a post 192, with the stop sign 190 being fabricated from a sheet of material made in accord with the present invention. FIG. 6 also illustrates other types of street signs which can be made in accord with the present invention, such as the yield sign 194, the speed limit sign 196, and the distance to the next city sign 198. To complete the stop sign 190, for example, once the sheet material has been octagonally shaped, with the desired dimensions, one can apply reflecting tape of any desired color, available from the 3M Corporation as SCOTCHLITE Reflection Sheeting to one side of the sign. The word "STOP" can then be silk screened over the reflecting tape in white, black, red or whatever color is desired.

The manufacture of such other signs, such as the yield sign 194, the speed limit sign 196, or the distance sign 198, will preferably also be produced in injection molds sized to produce sheets of the material according to the present invention, and then cut to the appropriate size.

Although the present invention is specifically tailored to street signs and highway signs, those skilled in this art will recognize from this disclosure that other types of signs, such as advertising signs and the like, or other sheet products having specified flexibility, can also be manufactured in accord with the present invention.

Based upon the excellent tests achieved with the composition of Example 4, showing a rigidity required for street signs without being brittle, combined with having a steel gray color closely resembling aluminum, prototype stop signs were cut from a sheet of the end product made in accord with the composition of Example 4. For those governmental agencies requiring a black color, to remind the public of the signs being made from old tires, one of the other examples can be used to make the signs.

In practicing the invention, I found that the injection mold temperature should preferably be in excess of 300° F., and even more preferably, be in a range of 400° to 450° F. I also found that the ground rubber should be maintained well below 50% of the end product composition, other than in the Example 6, when combining the reground rubber from the old tires with the ground virgin rubber, preferably less than 30% and most preferably at 21% of the end product composition. In addition, I discovered that the added polypropylene should preferably be less than 34% of the end product composition, and even more preferably, be approximately 28% of the end product composition.

What is claimed is:

1. A street sign comprised of:

a) at least 1% but less than 50%, by weight, of reground rubber;

b) at least 2% but no more than approximately 25%, by weight, of a styrene-butadiene block copolymer; and c) at least 25% but less than 34%, by weight, of a constituent selected from the class of polypropylene, polyethylene, acetal resin, or mixtures thereof.

2. A sheet product comprised of:

a) at least 1% but less than 50%, by weight, of reground rubber;

b) at least 2% but no more than 25%, by weight, of a styrene-butadiene block copolymer; and c) at least 25% but less than 34%, by weight, of a constituent selected from the class of polypropylene, polyethylene, acetal resin, or mixtures thereof.

3. The sheet product according to claim 2, in which the ground rubber is present in an amount of less than 30%, by weight.

4. The sheet product according to claim 3, in which the ground rubber is present in an amount of 21%, by weight.

5. The sheet product according to claim 3, in which the said constituent is present in an amount of 28%, by weight.

* * * * *